April 12, 1938.                L. ROSEMAN                2,113,771
                        STITCHED SNAP FASTENER TAPE
                            Filed July 27, 1936
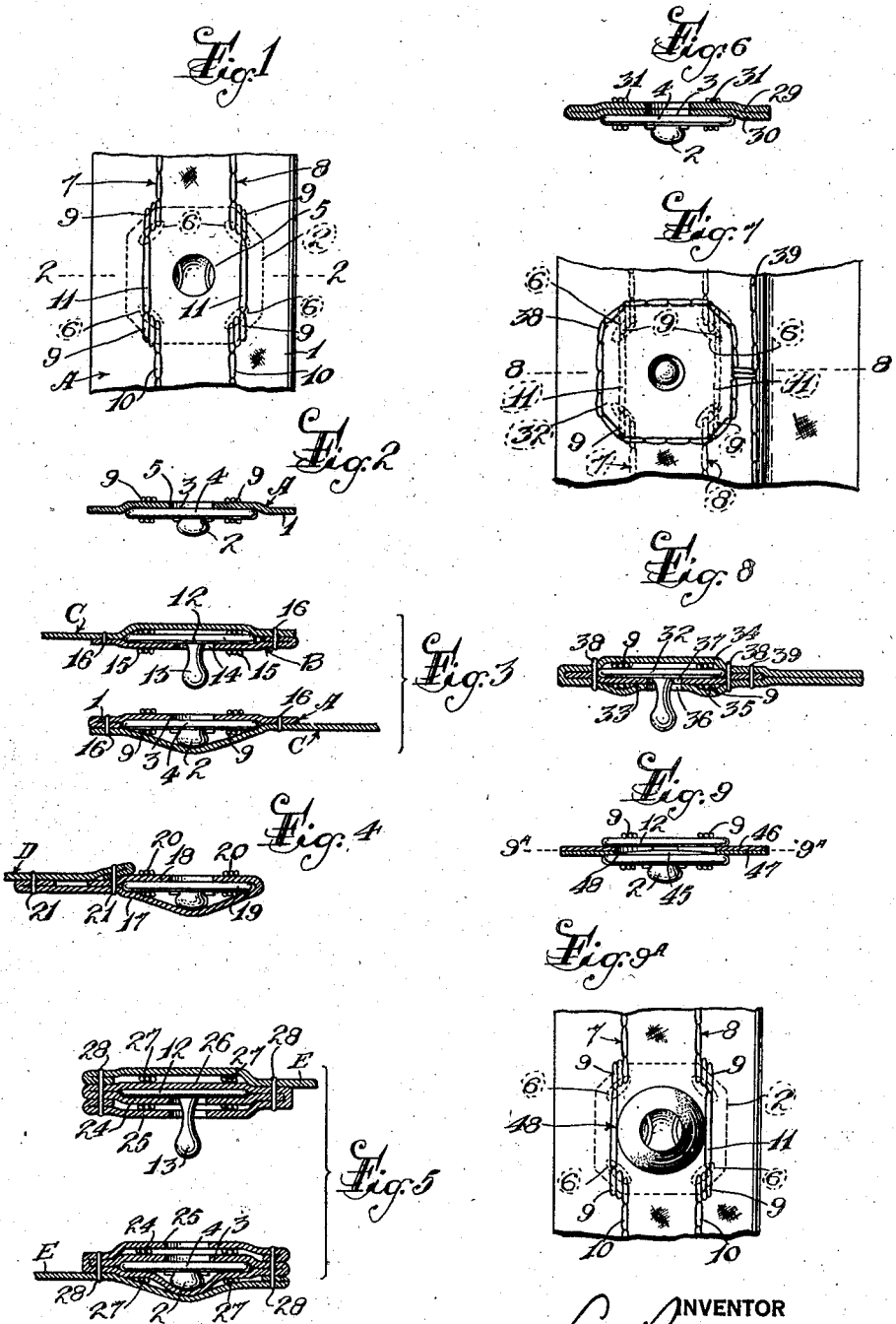

Patented Apr. 12, 1938

2,113,771

UNITED STATES PATENT OFFICE 2,113,771

STITCHED SNAP FASTENER TAPE

Leo Roseman, Newark, N. J.

Application July 27, 1936, Serial No. 92,711

1 Claim. (Cl. 2—265)

This invention relates in general to fasteners including pieces of fabric having separable fastener elements attached thereto, to be applied to the edges of openings in garments for fastening such edges together. More particularly the invention is directed to fastener tape embodying so-called snap fasteners or head and socket fasteners wherein the fastener elements are covered or concealed on the face of the strip or piece of material to which the elements are applied, or on the side of the strip which faces the complemental strip when the fastener is in use. This application is a continuation in part of my copending application Serial No. 31,547 filed July 16, 1935.

In one form of snap fastener, the snap fastener elements are sewed on one side of a piece of material by stitches passing through apertures in the fasteners, the fasteners being exposed and the heads and sockets facing away from the material. This form of fastener is highly objectionable because the strains on the fastener elements during use and opening of the fasteners are such as to tend to pull the fastener elements away from the material and this results in breaking of the stitches or tearing of the stitches out of the material so as to detach the fastener elements from the material and impair or destroy the fastener. Also, because of this it has been necessary to utilize fastener elements wherein the resistance to separation of the head and socket elements, as by the spring wires in the socket elements, is so weak that the fastener elements can be separated without tearing the material or breaking the stitches. This spring or frictional resistance has been so weak that it has not been adequate to hold the fastener elements together during use, so that the fastener elements easily separate under the normal strains imposed thereon during wearing of a garment to which the fasteners are applied and thereby impair the usefulness of the fasteners or make it impossible to use them.

The objections to this form of snap fastener tape have in part been overcome by other forms of snap fastener tape for example as covered by my Patents Nos. 2,033,651 and 2,033,650 in the former of which a row of snap fasteners having heads or sockets are mounted on one side of a strip of material with their faces abutting the strip, said strip having openings registering with the heads or sockets respectively of the fastener elements, each fastener element also having apertures between the head or socket and its edges, and stitches passing through the strip and said apertures for securing the fasteners to the strip. In my Patent No. 2,033,650 a row of snap fasteners are mounted between two plies of fabric and are secured in position by stitches passing through both of said plies and apertures in the fastener elements.

My present invention relates particularly to the two last mentioned types of fastener tape, and the prime object of the invention is to provide snap tape of this general character which shall embody novel and improved features of construction, whereby the fastener elements shall be firmly secured to the tape, the tape shall be thin and contain a small amount of fabric, and shall be strong, durable and relatively inexpensive.

In the form of snap fastener tape shown in the above-mentioned patents the fastener elements are secured to the strip of material by a single continuous line of stitches running longitudinally of the strip and including lateral or offset stitches passing through the apertures in the fastener elements. Other objects of the present invention are to provide a snap fastener tape of this character wherein each fastener element shall be secured by two separate sets of stitches each of which shall include a series of stitches passing through the apertures of the fastener elements, whereby the tape can be easily and quickly stitched in continuous lengths by a special two needle automatic sewing machine to save time by forming the two sets of stitches simultaneously and so that the tape shall be stronger and even should all of certain sets of stitches become broken or raveled, either during manufacture or use of the fastener, the other set or sets will hold the fastener elements in operative, serviceable position on the material, and the necessity for stopping the machines to cut or resew defectively sewed portions of the fastener is obviated; to provide such a fastener wherein each set of stitches shall comprise stitches running longitudinally of the row of fastener elements and lateral transverse or offset or tying stitches passing through some of the same apertures of the fastener elements through which pass the transverse stitches of the other set, or in other words, to provide such a fastener wherein some of the stitches of each set pass through the same apertures as stitches of the other set; and thus to provide two continuous lines of stitches extending longitudinally of the strip of material including stitches passing through the apertures of the fastener elements and other stitches disposed between adjacent fastener elements, all of the stitches being in substantial alinement with the row of fastener elements so as to provide effectual reenforcement for the strip and a secure attachment of the fastener elements to the strip.

Other objects, advantages and results will be brought out by the following description when read in connection with the accompanying drawing.

Referring to the accompanying drawing in which corresponding and like parts are designated throughout the several views by the same reference characters, Figure 1 is a face plan view of snap fastener tape embodying my invention and including socket fastener elements.

Figure 2 is a transverse sectional view on the line 2—2 of Figure 1.

Figure 3 is a composite transverse sectional view through complemental head fastener and socket fastener tapes embodying the invention, showing them attached to the edges of a garment.

Figure 4 is a transverse sectional view through the modified form of tape attached to the edge of a garment.

Figure 5 is a view similar to Figure 3 showing a modified form of the tape.

Figure 6 is a view similar to Figure 2 showing a modification of the tapes.

Figure 7 is a face plan view of a further modification of the tape including head fastener elements.

Figure 8 is a transverse sectional view on the line 8—8 of Figure 7.

Figure 9 is a transverse sectional view through head fastener and socket fastener tapes connected together showing a modification of the tapes to facilitate complete connection of the head and socket elements, and Figure 9A is a horizontal sectional view on the line 9A—9A of Figure 9.

Specifically describing the illustrated embodiment of the invention the reference character A designates the tape or strip which carries the socket fastener elements and B designates the tape or strip which carries the head fastener elements to cooperate with the fastener elements of the tape A.

The tape A is shown as consisting of a single ply of fabric 1 having a plurality of socket fastener elements 2 of known construction secured thereon in a row in spaced relation longitudinally of the strip with the face sides 3 of their bases 4 abutting the rear or bottom side of the strip 1. The strip has openings 5 registering with the openings in the sockets of the fastener elements, although of course, where the fabric is of a nature to permit holes to be formed therein by pressure of the heads of head fastener elements into the sockets through the fabric, the holes need not be formed during manufacture of the tape but may be formed by the user thereof. Also the fastener elements have apertures 6 in their bases which are disposed between the openings of the sockets and the edges of the bases, or at each of two opposite sides of the sockets, and the apertures of each fastener element are in alinement longitudinally of the row with the apertures of the other fastener elements. As shown, the fastener elements are approximately square in plan view although they may be of any suitable shape. The fastener elements are shown as securely attached to the fabric strip by two independent sets of stitches 7 and 8 one at each side of the row of fastener elements and each including superposed tying stitches 9 which pass through the apertures 6 at the corresponding sides of the sockets and the strip 1. Preferably the sets of stitches constitute continuous lines of stitches running longitudinally of the strip and including the tying stitches 9 and other stitches 10 which run through the strip between adjacent fastener elements. Each line of stitches also includes elongated or jump stitches 11 for bridging the portions of the fastener elements between the adjacent tying stitches 9 of the same set. The two sets of stitches may be conveniently formed simultaneously with a special two needle automatic sewing machine, so that the tape can be economically and rapidly produced.

The head fastener tape B is the same as the socket fastener tape A with the exception that head fasteners 12 are utilized in place of the socket fastener 2, the head 13 of the head fasteners extending through openings 14 corresponding to the openings 5, and the face sides of the bases of the fastener elements abutting the bottom or underside of the strip. The head fastener elements are secured on the tape by two sets of stitches 15 which may be identical with the stitches 7 and 8.

With this construction the fastener elements are secured to the fabric strip by the two sets of stitches, particularly two parallel longitudinal lines of stitches, and the stitches are in substantial alinement with the fastener elements longitudinally of the strip so as to effectually distribute the strains imposed on the fasteners during use over a large area of the strip. The tying stitches 9 and the stitches between the fastener elements can be formed in a continuous operation and the stitches between the fastener elements eliminate long jump stitches between the sets of tying stitches 9 and also reduce the possibility of the stitches 9 becoming unraveled. Furthermore the resistance to strains on the fabric and fastener elements imposed during use of the fastener tape is efficiently located with respect to the points of application of such strains to the stitches and fabric, the stitches having a nicely balanced relation to the fastener elements and the strip. This provides a much stronger tape than is possible with a single set or continuous line of stitches. Moreover, with the two independent sets of stitches should one set become frayed or broken, the fastener elements would still be held in position by the other set of stitches. It will also be observed that strains on the fastener elements during use thereof will be imposed upon and assumed directly by the strip and the tendency of such strains is to pull the fastener elements away from the stitches which overlie the bases of the fastener elements so that cutting or fraying of the stitches by the edges of the apertures is prevented. Such cutting or fraying of the stitches at the faces of the fasteners is prevented by the strip which is interposed between the fastener elements and the stitches.

In applying the fastener tapes to a garment, the tapes may simply be laid upon the edge of the garment C with the bases of the fasteners interposed between the strip 1 and the garment, whereupon the strip may be secured to the garment by lines of stitches 16 passing through edges of the strip and the garment.

A modification of the tape is shown in Figure 4 where a strip of fabric is folded longitudinally to form two plies 17 and 18 between which the fastener elements 19 are disposed. The fastener elements are secured to one of the plies by stitches 20 like the stitches 7 and 8 with the edges of the bases of the fastener elements snugly seated in the fold between the plies. The free edges of the plies may be secured together and to the edge of a garment D by lines of stitches 21.

In Figure 5 a further modification in the fold of the fabric strip is shown. Here the strip is folded to provide two superposed face plies 24 and 25 and a base ply 26, the fastener elements being interposed between the intermediate ply 25 and the base ply 26 with the faces of the fastener elements abutting the intermediate ply. The fastener elements are secured to the strip by parallel lines of stitches 27, like the stitches 7 and 8, which pass through only the base ply and intermediate ply 25. The outer face ply 24 serves to cover and conceal the stitches 27. The fastener tape is secured to the garment E with the base ply against the garment and with lines of stitches 28 passing through all plies of the tape and the garment.

In Figure 6 is shown a fastener tape which is the same as that illustrated in Figures 1 and 2 except that two plies or thicknesses 29 and 30 of fabric are embodied in the strip. The face sides of the bases 4 of the fastener elements 2 abut the underside or bottom strip, and the stitches 31 which secure the fasteners to the strip like stitches 7 and 8 pass through both plies of the strip.

In Figures 7 and 8 is shown a modification of the invention in which the fastener elements 32 are secured on one side of a strip 33 just as shown in Figures 2 and 3, and the strip 33 is interposed between two other plies of fabric 34 and 35 which may be formed of a single ply of material folded longitudinally. One of the plies, in the present instance the ply 35, has openings 36 registering with the openings 37 in the strip 33 which register with the heads or sockets of the fastener elements. An annular set of stitches 38 passes through all of the plies 33, 34 and 35 in closely embracing relation to the edges of each fastener element, and preferably the annular sets of stitches 37 are parts of a continuous line of stitches which also includes stitches 39 extending longitudinally of the plies 34 and 35. The plies 34 and 35 serve to cover the stitches which secure the fastener elements to the strip 33, for example stitches like 7, 8, 9 and 10, and the annular sets of stitches 38 secure the plies 34 and 35 tightly together over the respective fastener elements to prevent relative movement of the plies.

In order to facilitate the connection of the head fastener elements and the socket fastener elements in fastener tapes of this general character the fastener elements are generally slightly convex on their faces as indicated at 45 in Figure 9, and I contemplate utilizing this structure in combination with a novel construction of a fabric strip to permit the head fastener elements and socket fastener elements to be brought into closer relation and thereby facilitate complete and firm connection thereof. As shown in Figures 9 and 9A the fabric strips 46 and 47 corresponding to the strip 1 of Figure 2, have the openings surrounding the head fasteners and the openings of the socket fasteners enlarged as at 48 so that the convex portion 45 of the socket elements may pass at least partially through both plies 46 and 47 to permit the complemental fastener elements to be brought into complete and firm connection with each other. With reference to Figure 9A, it will be observed that the openings 48 are of such size as not to interfere in any way with a secure attachment of the fastener elements to the strips by the tying stitches 9.

It is a highly and strikingly important feature of the tape embodying my invention with the face of the fasteners abutting the strip and stitched thereto, that it will withstand tension under use in garments three or four times greater than tapes formed of the usual fabric having the fastener elements arranged between plies and having the fasteners secured by stitches penetrating only the base plies and apertures in the fastener elements or stitches penetrating all plies and snugly embracing the edges of the fasteners but not passing through apertures in the fastener elements, and at the same time requires less material for a given width of tape.

Each continuous set of stitches adequately secures the fastener elements in position on the piece of material independently of the other set, whereby each set compensates for broken or weak stitches of the other set and both sets of stitches can be formed simultaneously to enable rapid and continuous production on automatic machines.

While I have shown the fastener in tape form, it should be understood that the fastener elements may be secured directly to the edges of a garment opening or other articles in the same manner in which they are applied to strips of material or tape.

I have shown and described the invention as embodied in certain details of construction, but it should be understood that these are primarily for the purpose of illustrating the principles of the invention and that many modifications and changes may be made in the details of construction without departing from the spirit of the invention of the scope of the appended claim.

Having thus described my invention, what I claim is:

A fastener comprising a piece of material, a row of fastener elements thereon having heads or sockets at their faces centrally thereof to cooperate with complemental fastener elements and having apertures to receive stitches between said heads or sockets and the edges of said elements, and a plurality of independent continuous lines of stitches running longitudinally of said row and each having a plurality of superposed tying stitches extending longitudinally of said row and passing through said piece and certain of said apertures at one of two opposite sides of said heads or sockets of each fastener element so that the stitches of each line adequately operatively secure the fastener elements on the piece of material independently of the stitches of the other line, whereby each line compensates for broken or weak stitches of the other line.

LEO ROSEMAN.